United States Patent
Anderson et al.

(10) Patent No.: US 7,192,234 B2
(45) Date of Patent: Mar. 20, 2007

(54) INTEGRAL WASHER AND THREADED FASTENER ASSEMBLY AND METHOD FOR MAKING SAME

(75) Inventors: Jeffrey D. Anderson, South Elgin, IL (US); Kent D. Homfeldt, Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 24 days.

(21) Appl. No.: 10/139,885

(22) Filed: May 6, 2002

(65) Prior Publication Data

US 2002/0182032 A1    Dec. 5, 2002

Related U.S. Application Data

(63) Continuation-in-part of application No. 09/871,127, filed on May 31, 2001, now Pat. No. 6,899,503.

(51) Int. Cl.
*F16B 43/00* (2006.01)

(52) U.S. Cl. .................. 411/533; 411/368; 411/432; 411/338

(58) Field of Classification Search ............... 411/533, 411/366.1, 367, 368, 180, 183, 338, 339, 411/353, 999, 352, 107, 181, 432
See application file for complete search history.

(56) References Cited

U.S. PATENT DOCUMENTS

| | | | | |
|---|---|---|---|---|
| 405,227 | A * | 6/1889 | Schaubel | .............. 411/367 |
| 2,779,375 | A | 1/1957 | O'Connor | |
| 3,218,906 | A | 11/1965 | Dupree | |
| 3,386,771 | A * | 6/1968 | Verdier et al. | ......... 301/35.625 |
| 3,765,078 | A | 10/1973 | Gulistan | |
| 3,829,163 | A | 8/1974 | Hans | |
| 4,193,434 | A * | 3/1980 | Wagner | .............. 411/154 |
| 4,435,112 | A | 3/1984 | Becker | |
| 4,587,377 | A | 5/1986 | Rodseth | |
| 4,850,771 | A | 7/1989 | Hurd | |
| 4,900,209 | A | 2/1990 | Reynolds | |
| 4,969,788 | A * | 11/1990 | Goiny | .............. 411/428 |
| 4,971,498 | A | 11/1990 | Goforthe | |
| 5,020,951 | A | 6/1991 | Smith | |
| 5,244,325 | A * | 9/1993 | Knohl | .............. 411/353 |

(Continued)

FOREIGN PATENT DOCUMENTS

DE    19534389 A1    3/1997

(Continued)

OTHER PUBLICATIONS

STEMS Washer and Screw Assemblies Pamphlet; ITW Shakeproof.

Primary Examiner—William L. Miller
(74) Attorney, Agent, or Firm—Fletcher Yoder (57) ABSTRACT

An assembly of a threaded fastener and a stemmed washer is provided, such as for applications in which a standoff is desired between a washer and a mating threaded fastener. The stemmed washer includes a washer portion and a standoff portion extending from the washer portion. The threaded fastener has a retaining structure extending about the washer portion and capturing the washer structure in an assembly with the threaded fastener. For example, the retaining structure may have a washer receptacle for the washer portion. The washer portion is captured in the washer receptacle by a deformed catch section below the washer portion.

34 Claims, 6 Drawing Sheets

U.S. PATENT DOCUMENTS

| | | |
|---|---|---|
| 5,380,136 A | 1/1995 | Copple et al. |
| 5,468,104 A | 11/1995 | Reid et al. |
| 5,528,812 A | 6/1996 | Müller |
| 5,584,628 A * | 12/1996 | Bernoni ................ 411/84 |
| 5,662,444 A | 9/1997 | Schmidt, Jr. |
| 5,688,091 A | 11/1997 | McKinlay |
| 5,807,052 A * | 9/1998 | Van Boven et al. ........ 411/353 |
| 5,934,851 A | 8/1999 | Stewart et al. |
| 6,030,161 A | 2/2000 | Udell et al. |
| 6,102,610 A | 8/2000 | Palusis et al. |
| 6,309,156 B1 * | 10/2001 | Schneider .................. 411/353 |
| 6,543,979 B2 * | 4/2003 | Iwatsuki .................... 411/180 |
| 6,623,226 B2 * | 9/2003 | Braun et al. ................ 411/353 |
| 6,676,345 B2 * | 1/2004 | Szczukowski et al. ......... 411/9 |
| 2002/0182031 A1 | 12/2002 | Anderson et al. |

FOREIGN PATENT DOCUMENTS

| | | |
|---|---|---|
| EP | 0 004 185 A1 | 9/1979 |
| GB | 1047545 | 11/1966 |
| GB | 2 109 079 A | 5/1983 |

\* cited by examiner

INTEGRAL WASHER AND THREADED FASTENER ASSEMBLY AND METHOD FOR MAKING SAME

CROSS-REFERENCE TO RELATED CASE

The following is a continuation in part of application Ser. No. 09/871,127, filed on May 31, 2001 now U.S. Pat. No. 6,899,503.

BACKGROUND OF THE INVENTION

The present invention relates generally to the field of threaded fasteners, and more particularly to a threaded fastener, such as a threaded nut or bolt, joined in an assembly with a stemmed washer. The invention also relates to a manner for retaining a stemmed washer in an assembly with a threaded fastener, and to a method for making the assembly.

A variety of applications are known for threaded fasteners used with standoffs. In a number of applications wherein one or more compressible materials are to be secured, for example, a standoff is commonly inserted into an aperture in the compressible material, and threaded or other fasteners are placed through the standoff for securing the compressible material in a desired position. Compressible materials on which standoffs are commonly used include various plastics, rubbers, foam materials, and so forth, but may also include expanded metals, cellulosic products, and so forth. Moreover, standoffs are also commonly used in applications wherein penetration of one or more fasteners is to be limited, although the material being fastened in place is not necessarily particularly compressible, such as in fragile or brittle materials.

Where applications call for the use of mechanical standoffs, prior art arrangements have typically relied upon separate components which are brought together in place to permit securing without crushing compressible materials, or while maintaining a desired distance between mechanical components, typically a screw or bolt and a nut. Thus, in a traditional assembly, a standoff is placed in the receiving aperture, a screw or bolt is passed through the aperture and standoff, and a traditional washer and nut are secured on the opposite side. While such arrangements provide generally adequate resistance to crushing and maintain desired mechanical distances between the joined fasteners, they require several separate parts and can entail considerable assembly time for insertion of the standoff, and assembly of the fasteners. Moreover, the various separate parts must be individually manufactured, shipped, stored and brought together in the final assembly.

There is a need, therefore, for an improved arrangement for securing fasteners to one another in applications requiring standoffs. There is a particular need for a technique that would facilitate assembly, while providing a high degree of resistance to crushing, and which would maintain desired distance between elements of the threaded assembly.

SUMMARY OF THE INVENTION

The present technique provides an assembly of a threaded fastener with a stemmed washer designed to respond to such needs. The washer may include a generally planar section, which is designed to fit against an element being fastened in a manner of a conventional washer, and a standoff section extending from the planar section. The standoff and washer are hollow, thereby permitting a fastener, such as a screw or bolt, to be inserted therethrough. The washer can be dimensioned such that sufficient distribution of load is maintained to avoid damage to the elements being fastened. The standoff can be made any suitable length, and may be tailored to specific applications, depending upon the desired thickness or final dimensions of the elements being fastened.

The threaded fastener assembled with the stemmed washer may be any suitable type, such as a nut or bolt. In the former case, the nut has a projecting rim, which forms an annular receptacle for the washer at an attachment side of the nut. In the latter case, the bolt has a head with a projecting rim, which forms an annular receptacle for the washer at an attachment side of the head. In these exemplary embodiments, an outer portion of the projecting rim is deformed inwardly to capture the washer in the assembly, while allowing the nut or bolt to rotate freely with respect to the washer. The entire assembly may be manufactured in a straightforward and cost-effective manner. In one exemplary method, for example, a stamping process is used to form the washer and standoff element.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
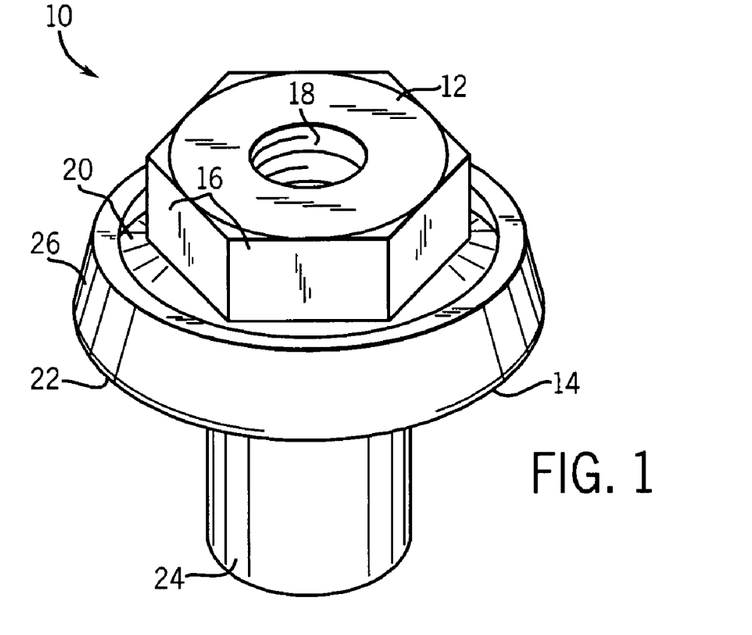
FIG. 1 is a perspective view of a fastener and stemmed washer assembly in accordance with certain aspects of the present technique.

Turning now to the drawings and referring first to FIG. 1, an assembly is illustrated in accordance with the present technique and designated generally by reference numeral 10. The assembly includes an internally threaded fastener 12 secured to a stemmed washer 14. In the illustrated embodiment the fastener 12 is a hex nut having hex flats 16 for interfacing with a conventional wrench. Internal threads 18 are provided for interfacing with a mating threaded fastener as described in greater detail below. A peripheral flange 20 is formed around a base of fastener 12 to interface with a corresponding portion of the stemmed washer to maintain the fastener in the assembly and to permit free spinning of the fastener for securement in an application.

The stemmed washer 14 includes features which serve both as a conventional washer, as a standoff, and as a retaining structure for the fastener 12. In the illustrated embodiment, the stemmed washer 14 thus includes a generally planar washer portion 22 integrally formed with a standoff portion 24. Standoff portion 24 is generally right cylindrical in shape in the illustrated embodiment, although other overall shapes (e.g., tapered) may be employed. Moreover, the shape and contour of the washer portion 22 may be adapted for various purposes, and may deviate from the planar shape illustrated. The retaining portion 26 extends upwardly from the washer portion 22 and extends inwardly slightly over the flange 20 of the fastener to retain the fastener within the assembly. In a present embodiment, the retaining portion 26 fits loosely around the flange 20 to permit free spinning movement of the fastener within the assembly.

Figure 2:
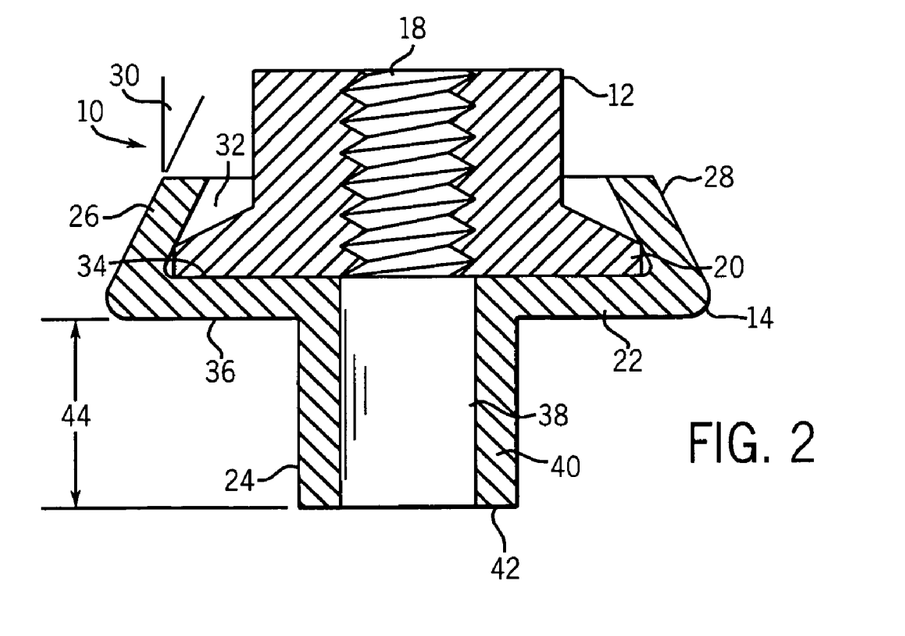
FIG. 2 is a sectional view through the assembly of FIG. 1 illustrating an exemplary configuration of the internally threaded fastener and stemmed washer.

Referring to FIG. 2, the assembly of FIG. 1 is illustrated in cross-section. As noted above, the assembly 10 includes a fastener 12 and a stemmed washer 14. The stemmed washer includes a washer portion 22, a lower standoff portion 24, and a retaining portion 26. In the illustrated embodiment, the retaining portion 26 generally forms an upstanding skirt 28 bent inwardly towards the fastener 12 so as to retain the fastener by interference with the flange 20 provided at the lower extremity of the fastener. While the upstanding skirt 28 may have any suitable shape and contour, in the illustrated embodiment the skirt is angled inwardly slightly through an angle 30 to form a cavity 32 in which the fastener is retained. The fastener thus rests upon a base 34 of the cavity 32 and exerts force against the base when drawn into engagement with a mating fastener. The washer portion 22 presents an abutment surface 36 at its lower face opposite the base 34 for contacting an element to be secured in place. Below the abutment surface 36, the standoff portion 24 has an aperture 38 extending therethrough for receiving a mating fastener as described below. Aperture 38 is surrounded by side walls 40, which is noted above, may be straight cylindrical in shape as illustrated, or may be contoured, flared, or otherwise bent or ridged. A lower abutment end 42 of the standoff portion 24 serves to contact a mating surface, such as of a mating fastener as described below.

Various lengths of the standoff portion 24 may be provided, as illustrated at reference numeral 44 in FIG. 2. In the illustrated embodiment, the dimension 44 extends between the abutment surface 36 and the abutment end 42, thereby defining a final dimension between which elements to be secured in place are disposed. Thus, the length of dimensions 44 will generally correspond to a desired distance between an upper location of an element to be secured in place, and a lower location of a mating component, such as a fastener.

Figure 3:
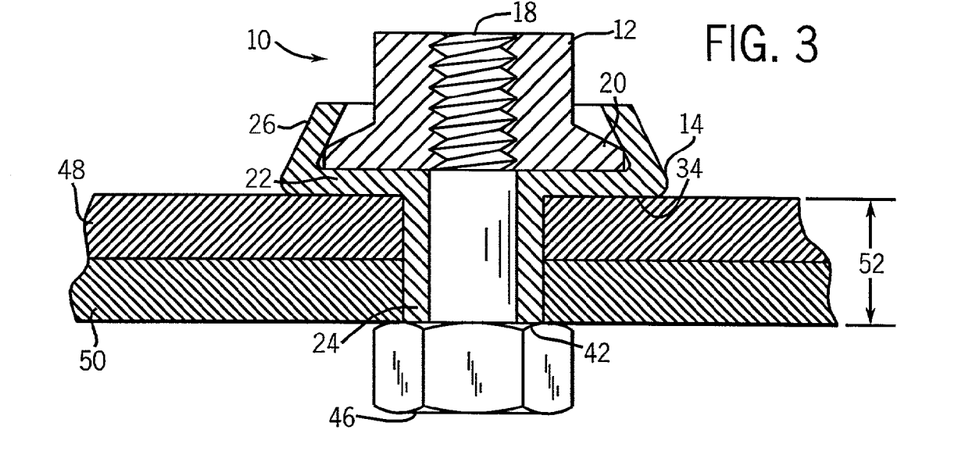
FIG. 3 is a sectional view of the assembly illustrated in FIGS. 1 and 2, installed with a mating fastener to maintain elements in the desired location within a final assembly.

The assembly of FIGS. 1 and 2 is illustrated in an application in FIG. 3. As shown in FIG. 3, the assembly 10 is designed to cooperate with a mating fastener 46, such as a screw or bolt, which is received within the internally threaded fastener 12 of the assembly. In practice, the assembly 10 may be simply inserted into apertures formed within elements to be secured to one another, such as element 48 and element 50 in the illustrated embodiment of FIG. 3, and the mating fastener 46 inserted from an opposite side. The fastener 46, and/or the fastener 12 may then be rotated to join the assembly 10 to the fastener 46, with the elements 48 and 50 lodged therebetween. In the illustrated embodiment the fastener 12 is free to rotate within assembly 10 as described above. In certain applications, however, the fastener may be fixed with respect to the retaining stemmed washer, such that only fastener 46 is rotated for securement.

The final assembly presents a spacing or dimension 52 between the abutment surface 36 and abutment end 42 of the stemmed washer 14. In general, the dimension 52 will be equivalent to dimension 44 illustrated in FIG. 2. It should be noted that the final dimension may provide for loose attachment of the elements to one another, or slight crushing or compression of one or both elements. The arrangement is thus particularly well suited to fastening components that may be damaged or deformed in use, such as plastics, rubbers, expanded metals, and so forth. The arrangement is also particularly well suited to fastening components for which dimensions should be maintained or over-pressure should be avoided, such as metal, glass, and other harder and dimensionally stable components.

Figure 4:
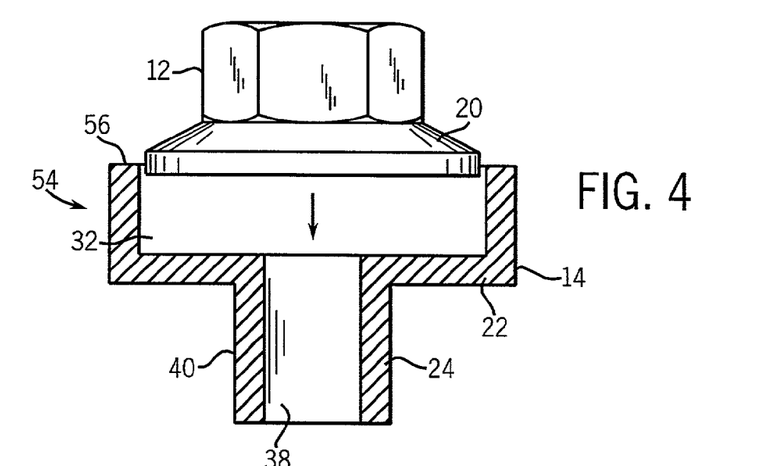
FIGS. 4 and 5 are sectional views of the assembly of FIGS. 1 and 2 showing steps in progressive manufacture of the assembly for retaining the threaded fastener within the stemmed washer.
Figure 5:
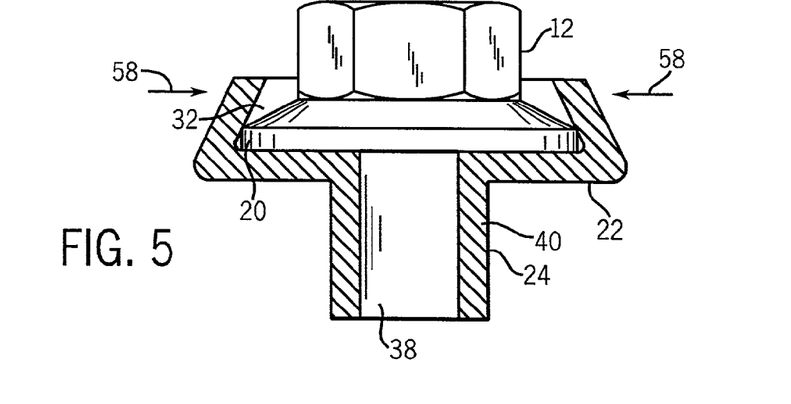

FIGS. 4 and 5 illustrate progressive manufacturing assembly of the elements described above. In a present embodiment, the stemmed washer 14 is formed, such as by a drawing or stamping operation, from a blank 54. The blank 54 presents the standoff portion 24 and integral washer portion 22, with the washer portion 22 presenting a generally upstanding open skirt 54 defining cavity 32. The internally threaded fastener 12 is then placed within the cavity 32 as illustrated in FIG. 4. With the fastener thus in place, the open skirt 56 of FIG. 4 is bent inwardly, such as in a crimping operation, as illustrated by arrows 58 in FIG. 5. As noted above, while this operation may secure the fastener rigidly within the assembly to prevent rotation, in a presently preferred configuration, the fastener 12 may freely spin within the cavity 32 to allow securement to a mating fastener, while the stemmed washer remains stationary.

Figure 6:
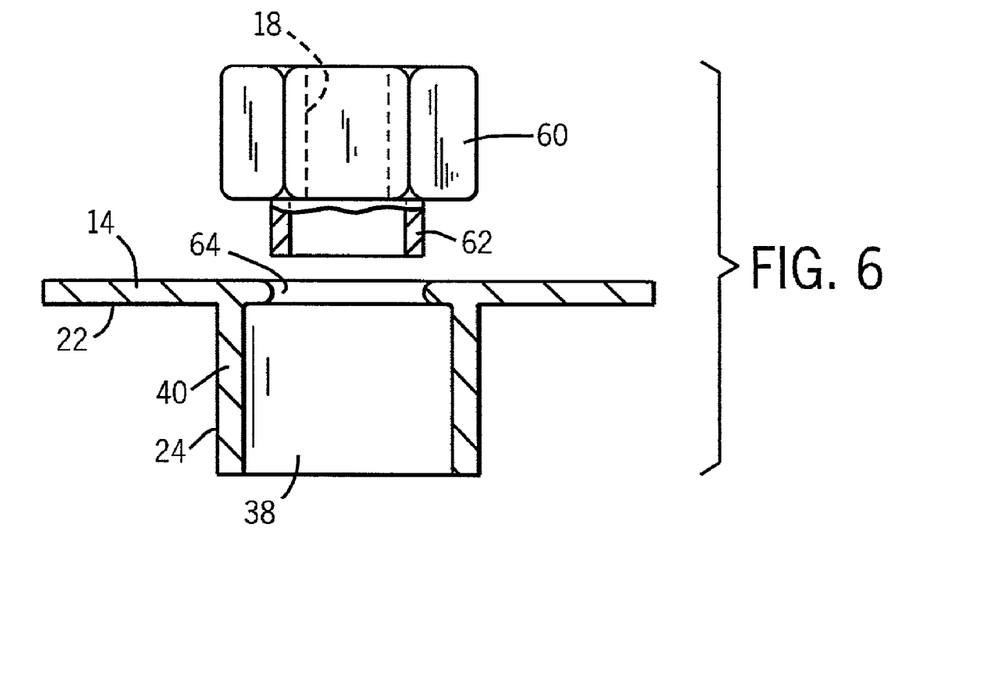
FIGS. 6 and 7 illustrate in partial section an alternative configuration of a threaded fastener secured to a stemmed washer in accordance with aspects of the present technique.
Figure 7:
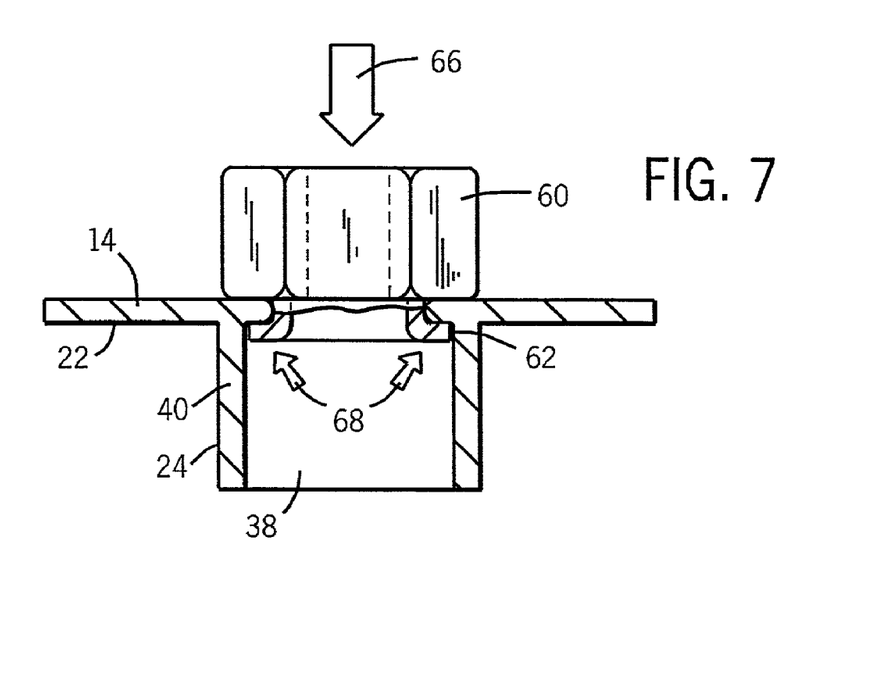

FIGS. 6 and 7 illustrate an alternative configuration of an internally threaded fastener secured to a stemmed washer. In the embodiment of FIGS. 6 and 7, an alternative threaded fastener 60 includes internal thread 18 as in the previous embodiments, but further includes a lower skirt or extension 62. Skirt 62 may be formed by any suitable process, such as during the initial fabrication of the fastener. Extension 62 forms a generally cylindrical skirt extending downwardly from the threaded fastener. Various configurations for the skirt may be envisaged. For example, the skirt may be continuous, extending in an uninterrupted cylinder around the base of the fastener, or may be discontinued, forming tabs or individual extension feet around the fastener. The stemmed washer 14 in this embodiment includes a radially-projecting internal ridge 64 designed and dimensioned to receive the skirt 62 of the fastener.

As the assembly is brought together, as illustrated in FIG. 7, the internally threaded fastener 60 is lowered into the aperture formed by the ridge 64, as illustrated by arrow 66. The skirt is then deformed plastically, such as through a crimping or flaring operation, to secure the skirt within the stemmed washer. In the illustrated embodiment, skirt 62 is deformed so as to provide for free rotation of the fastener within the stemmed washer. Alternatively, the deforming operation performed on the skirt may be such as to fixedly secure the nut with relation to the stemmed washer to prevent their mutual rotation.

Figure 12:
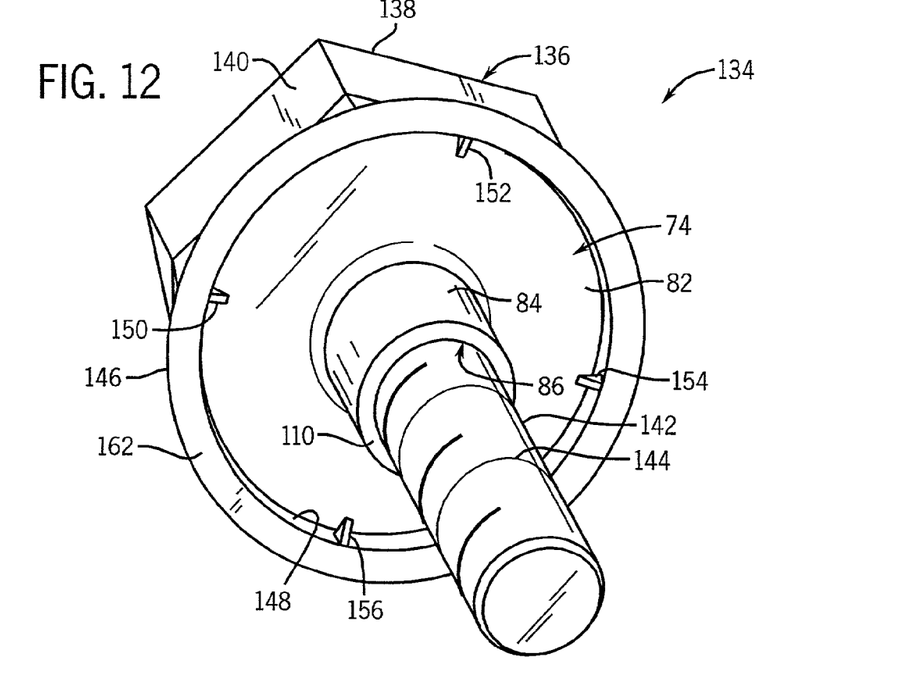
FIG. 12 is a perspective view of an alternative washer-fastener assembly having a stemmed washer captured within a retaining structure of an externally threaded fastener.
Figure 13:
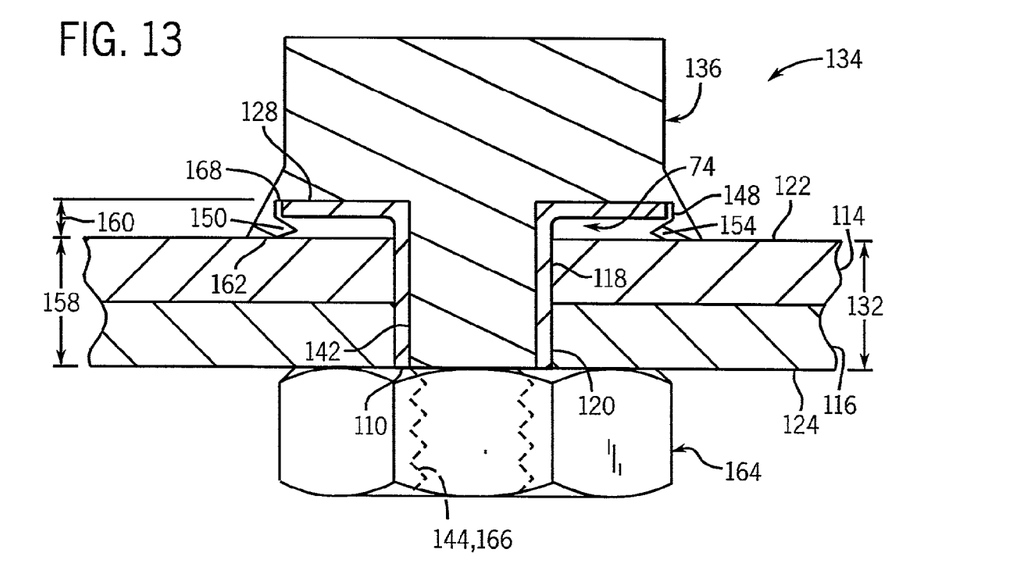
FIG. 13 illustrates an exemplary application of the washer-fastener assembly illustrated by FIG. 12.

In addition to the embodiments illustrated by FIGS. 1–7, the present technique may comprise an integral washer and fastener assembly, which is formed by retaining the washer within the fastener rather than retaining the fastener within the washer. FIGS. 8–11 illustrate one such embodiment having a stemmed washer rotatably captured by an internally threaded fastener, while FIGS. 12–13 illustrate another such embodiment having a stemmed washer rotatably captured by an externally threaded fastener. In these alternative embodiments, a projecting rim or flange is formed on the fastener rather than the stemmed washer. The stemmed washer is then rotatably captured by the fastener via a compressive deformation process, which deforms the flange inwardly around an underside of the stemmed washer.

Figure 8:
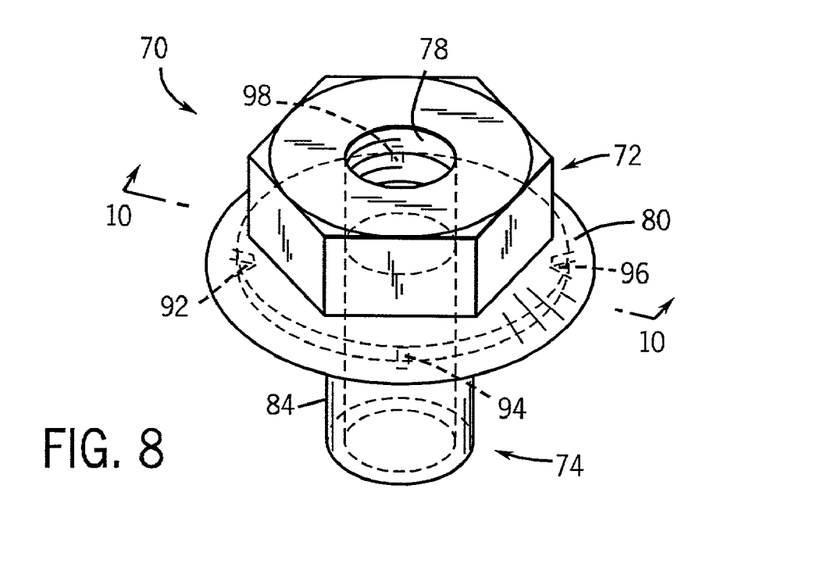
FIGS. 8 and 9 are perspective views of an alternative washer-fastener assembly having a stemmed washer captured within a retaining structure of an internally threaded fastener.

FIG. 8 is a top perspective view of an alternative washer-fastener assembly 70 having an internally threaded fastener 72 secured to a stemmed washer 74. In the illustrated embodiment, the internally threaded fastener 72 is a hex nut having hex flats 76 for interfacing with a conventional wrench. The internally threaded fastener 72 also has internal threads 78 for interfacing with a mating threaded fastener, such as an externally threaded bolt, as described in further detail below. At an underside of the internally threaded fastener 72, a peripheral flange or projecting rim 80 is formed to interface with a corresponding portion of the stemmed washer 74 to retain the stemmed washer 74 rotatably with the internally threaded fastener 72.

Figure 9:
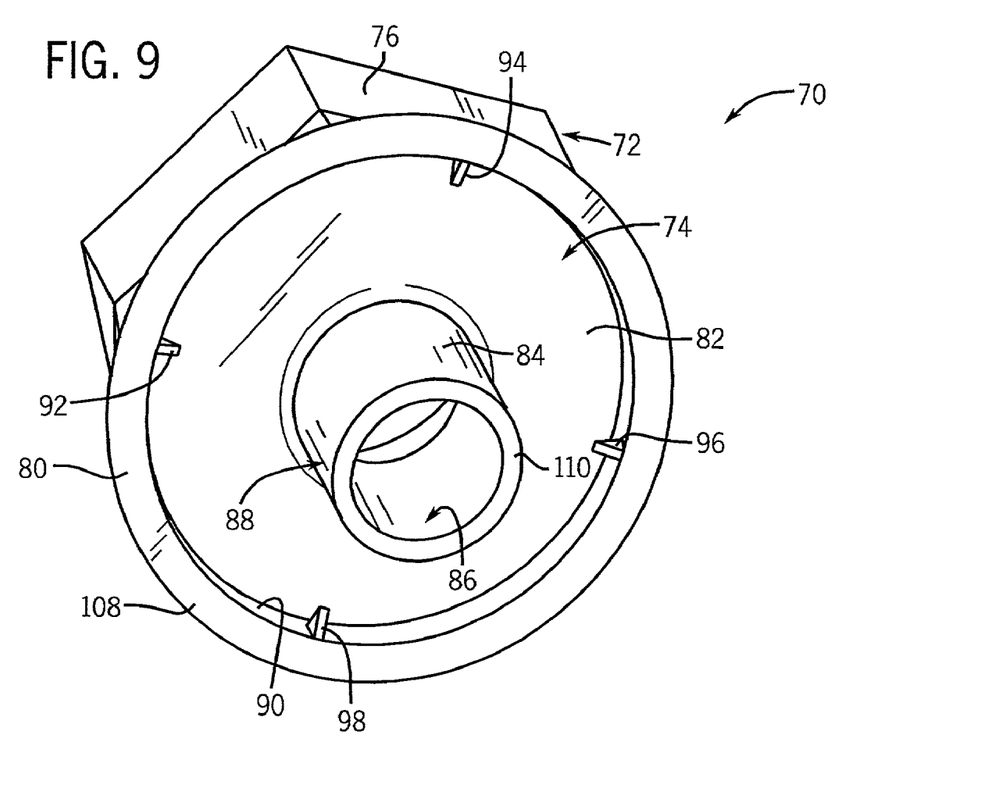

FIG. 9 is a bottom perspective view of the washer-fastener assembly 70 illustrating the coupling between the internally threaded fastener 72 and the stemmed washer 74. As discussed above, the stemmed washer 74 includes features that serve both as a conventional washer, as a standoff, and as a retaining structure for the internally threaded fastener 72. In the illustrated embodiment, the stemmed washer 74 includes a generally planar washer portion 82 integrally formed with a standoff portion 84. Although the standoff portion 84 may have a variety of shapes and dimensions, the illustrated standoff portion 84 has a cylindrical inner passage 86 for an externally threaded fastener, such as a threaded bolt, which is rotatably securable with the internal threads 78 of the internally threaded fastener 72. The standoff portion 84 also has an outer mount structure 88, which has an elongated cylindrical geometry insertable into a cylindrical mount receptacle for the standoff portion 84.

As illustrated by FIG. 9, the washer portion 82 of the stemmed washer 74 is inserted into a disk-shaped recess 90 formed within the projecting rim 80 of the internally threaded fastener 72. The disk-shaped recess 90 of the4 fastener 72 may be formed by casting, molding, impact-based shape-forming techniques, or any other suitable manufacturing technique. The stemmed washer 74 is rotatably secured within the disk-shaped recess 90 by providing a reduced diameter structure at an outer portion of the projecting rim 80. The reduced diameter structure prevents separation of the internally threaded fastener 72 from the stemmed washer 74, while it allows rotation between the fastener 72 and the washer 74 to facilitate a threaded coupling between the fastener 72 and a mating fastener. In the illustrated embodiment, the reduced diameter structure is formed by staking, crimping, impacting, compressing, or otherwise structurally deforming the projecting rim 80 inwardly to form retention members, such as retention stakes 92, 94, 96, and 98, at an underside of the washer portion 82. Any suitable number, geometry, or configuration of retention members is within the scope of the present technique.

Figure 10:
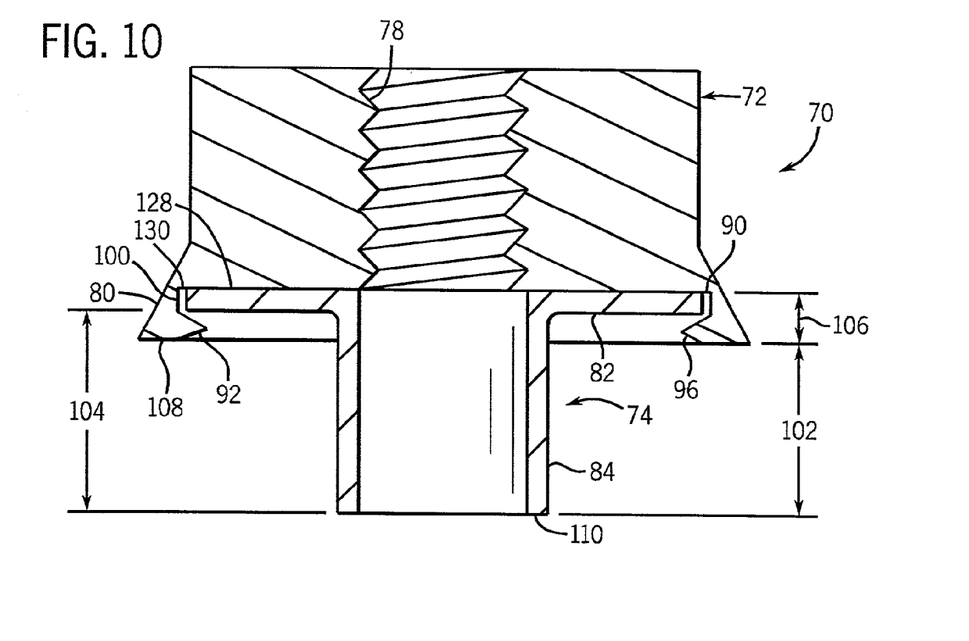
FIG. 10 is a sectional view of the assembly illustrated by FIGS. 8 and 9.

FIG. 10 is a cross-sectional side view of the washer-fastener assembly 70 illustrating the rotatable coupling between the internally threaded fastener 72 and the stemmed washer 74. As noted above, the washer-fastener assembly 70 is formed by capturing the washer portion 82 of the stemmed washer 74 within the disk-shaped recess 90 of the internally threaded fastener 72. For example, the retention stakes 92-98 may be formed by externally impacting the projecting rim 80 below an interior portion 100 of the disk-shaped recess 90, such that clearance is maintained between the washer portion 82 and the disk-shaped recess 90 to allow rotation between the fastener 72 and the stemmed washer 74. As illustrated by FIG. 10, the washer-fastener assembly 70 has a standoff depth of dimension 102, which is defined by the difference between a standoff length 104 of the standoff portion 84 and a recess depth 106 of the disk-shaped recess 90. In other words, the standoff depth 102 is the partial length of the standoff portion 84 extending beyond an abutment surface 108 of the internally threaded fastener 72 to an abutment end 110 of the standoff portion 84.

Figure 11:
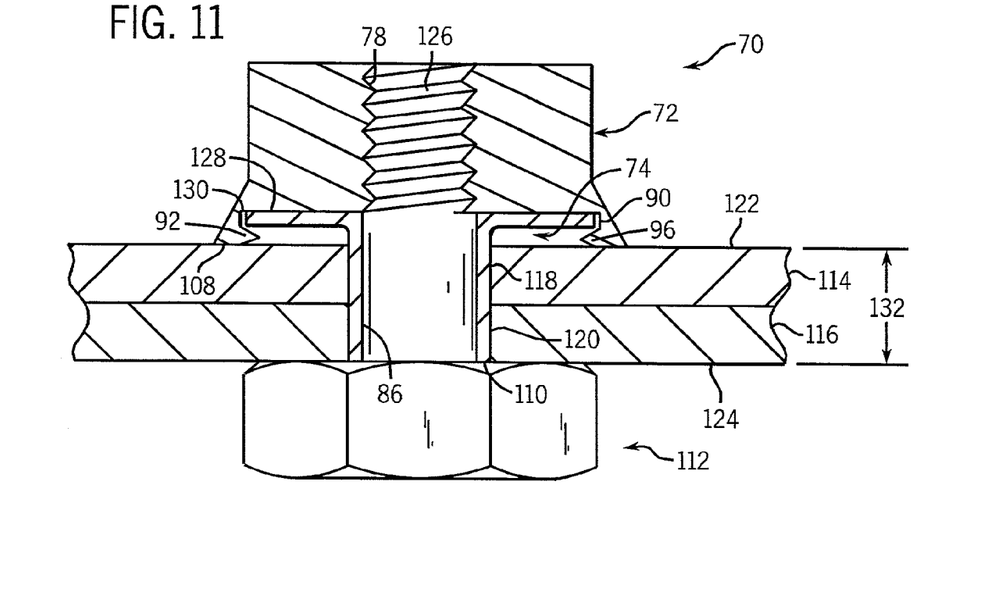
FIG. 11 illustrates an exemplary application of the washer-fastener assembly illustrated by FIGS. 8–10.

In operation, the standoff depth 102, the abutment surface 108, and the abutment end 110 define a final fastening dimension between which elements may be disposed and fastened by the washer-fastener assembly 70 and a mating fastener, as illustrated by FIG. 11. FIG. 11 illustrates an exemplary application of the washer-fastener assembly 70. As illustrated, the washer-fastener assembly 70 cooperates with a mating fastener 112, such as an externally threaded bolt, to couple elements 114 and 116. In practice, the washer-fastener assembly 70 engages elements 114 and 116 by inserting the standoff portion 84 into apertures 118 and 120 of the elements 114 and 116 until the abutment surface 108 of the internally threaded fastener 72 contacts an outer surface 122 of the element 114. The mating fastener 112 is then inserted into the cylindrical inner passage 86 of the stemmed washer 74 from an outer surface 124 of the element 116. Upon reaching the internal threads 78 of the internally threaded fastener 72, the internally threaded fastener 72 and the mating fastener 112 are rotated relative to one another to couple external threads 126 of the mating fastener 112 with the internal threads 78 of fastener 72. The foregoing rotation proceeds until the mating fastener 112 contacts the abutment end 110 and an upper face 128 of the stemmed washer 74 contacts an upper face 130 of the disk-shaped recess 90. Accordingly, the internally threaded fastener 72 and the mating fastener 112 interconnect the elements 114 and 116 at the standoff dimension 102, which generally corresponds to dimension 132 of the elements 114 and 116. However, the internally threaded fastener 72 may be adapted to provide a loose, balanced, or compressed attachment of the elements 114 and 116.

As mentioned above, the foregoing techniques are applicable to a wide variety of male and female fasteners, such as nuts and bolts. FIGS. 12 and 13 illustrate an alternative washer-fastener assembly 134 having the stemmed washer 74 rotatably captured by an externally threaded fastener 136. As illustrated by FIG. 12, the externally threaded fastener 136 has a hex shaped head 138 with hex flats 140 for interfacing with a conventional wrench. The externally threaded fastener 136 also has a projecting portion 142 having external threads 144 for interfacing with a mating threaded fastener, such as an internally threaded nut, as described in further detail below. At an underside of the externally threaded fastener 136, a peripheral flange or projecting rim 146 is formed to interface with a corresponding portion of the stemmed washer 74 to retain the stemmed washer 74 rotatably with the externally threaded fastener 136.

In the illustrated embodiment of FIG. 12, the washer portion 82 of the stemmed washer 74 is inserted into a disk-shaped recess 148 formed within the projecting rim 146 of the externally threaded fastener 136. The disk-shaped recess 148 of the fastener 136 may be formed by casting, molding, impact-based shape-forming techniques, or any other suitable manufacturing technique. As described above with reference to the washer-fastener assembly 72 of FIGS. 8–11, the stemmed washer 74 is rotatably secured within the disk-shaped recess 148 by providing a reduced diameter structure at an outer portion of the projecting rim 146. The reduced diameter structure prevents separation of the externally threaded fastener 136 from the stemmed washer 74, while it allows rotation between the fastener 136 and the washer 74 to facilitate a threaded coupling between the fastener 136 and a mating fastener. In the illustrated embodiment, the reduced diameter structure is formed by staking, crimping, impacting, compressing, or otherwise structurally deforming the projecting rim 146 inwardly to form retention members, such as retention stakes 150, 152, 154, and 156, at an underside of the washer portion 82. Any suitable number, geometry, or configuration of retention members is within the scope of the present technique.

FIG. 13 illustrates an exemplary application of the washer-fastener assembly 134. Similar to the washer-fastener assembly 70 illustrated by FIGS. 8–11, the washer-fastener assembly 134 has a standoff depth 158 defined by the difference between the standoff length 104 of the standoff portion 84 and a recess depth 160 of the disk-shaped recess 148. In other words, the standoff depth 158 is the partial length of the standoff portion 84 extending beyond an abutment surface 162 of the externally threaded fastener 136 to the abutment end 110 of the standoff portion 84. In practice, the standoff depth 102, the abutment surface 162, and the abutment end 110 define the final fastening dimension between which elements 114 and 116 are disposed and fastened by the washer-fastener assembly 134 and a mating fastener, such as internally threaded fastener 164.

The washer-fastener assembly 134 engages elements 114 and 116 by inserting the projecting portion 142 and the standoff portion 84 into apertures 118 and 120 until the abutment surface 162 contacts the outer surface 122 of element 114. The internally threaded fastener 164 is then engaged with the projecting portion 142, which extends beyond the outer surface 124 of the element 116. The externally threaded fastener 136 and the internally threaded fastener 164 are rotated relative to one another to couple internal threads 166 of fastener 164 with the external threads 144 of fastener 136. The foregoing rotation proceeds until the internally threaded fastener 164 contacts the abutment end 110 and the upper face 128 of the stemmed washer 74 contacts an upper face 168 of the disk-shaped recess 148. Accordingly, the externally threaded fastener 136 and the internally threaded fastener 164 interconnect the elements 114 and 116 at the standoff dimension 158, which generally corresponds to dimension 132 of the elements 114 and 116. As noted above, the externally threaded fastener 136 may be adapted to provide a loose, balanced, or compressed attachment of the elements 114 and 116.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, the present techniques are applicable to a wide variety of washers and rotatably securable fasteners, such as nuts and bolts. Moreover, a variety of flanges, projecting rims, skirt structures, and compressive securement mechanisms may be used within the scope of the present technique.

What is claimed is:

1. A threaded fastener assembly, comprising:
 a stemmed washer having a washer portion and a standoff portion extending from the washer portion to a peripheral end, wherein the standoff portion is a hollow right cylinder extending substantially perpendicular relative to the washer portion; and
 a one-piece threaded fastener having a retaining portion extending at least partially about a circumference of the washer portion to retain the stemmed washer.

2. The assembly of claim 1, wherein the retaining portion comprises a flange having a recess to receive the washer portion and at least one catch structure extending into the recess below the washer portion.

3. The assembly of claim 1, wherein the retaining portion comprises at least one structurally deformed section of the one-piece threaded fastener that captures the washer portion.

4. The assembly of claim 3, wherein the at least one structurally deformed section comprises a staked section.

5. The assembly of claim 1, wherein the one-piece threaded fastener and the stemmed washer are rotatable with respect to one another in the assembly.

6. The assembly of claim 1, wherein the washer portion is generally planar.

7. The assembly of claim 1, wherein the one-piece threaded fastener has an internally threaded section.

8. The assembly of claim 7, wherein the one-piece threaded fastener is a threaded nut having flats extending from the stemmed washer.

9. The assembly of claim 1, wherein the one-piece threaded fastener has an externally threaded section.

10. The assembly of claim 9, wherein the one-piece threaded fastener is a threaded bolt having flats extending from the washer portion and having the externally threaded section extending through and outwardly from the standoff portion.

11. The assembly of claim 1, wherein the peripheral end is adapted to engage another fastener mateable with the threaded fastener.

12. The assembly of claim 1, comprising another fastener mated with the one-piece threaded fastener, wherein standoff portion limits compression between the one-piece threaded fastener and the other fastener.

13. A threaded fastener assembly, comprising:
 a washer structure having a washer portion and a standoff portion extending from the washer portion to an offset fastener end, wherein the standoff portion is a hollow right cylinder extending substantially perpendicular relative to the washer portion; and
 an internally threaded fastener having a retaining structure extending about a circumference of the washer portion and capturing the washer structure in an assembly with the internally threaded fastener, wherein the offset fastener end is adapted to receive an externally threaded fastener mateable with the internally threaded fastener.

14. The assembly of claim 13, wherein the retaining structure comprises a washer recess to capture the washer portion.

15. The assembly of claim 14, wherein the retaining structure comprises at least one reduced diameter catch section in the washer recess adjacent the washer portion.

16. The assembly of claim 15, wherein the at least one reduced diameter catch section comprises an inwardly deformed section of the washer recess.

17. The assembly of claim 13, wherein the internally threaded fastener and the washer structure are rotatable with respect to one another in the assembly.

18. The assembly of claim 13, wherein the washer portion is generally planar.

19. The assembly of claim 13, wherein the internally threaded fastener is a nut having flats engageable by a tool.

20. A threaded fastener assembly, comprising:
   a washer structure having a washer portion and a standoff portion extending from the washer portion to an end insertable into a structure from a first side to a second side, wherein the standoff portion is a hollow right cylinder extending substantially perpendicular relative to the washer portion; and
   an externally threaded fastener having a retaining structure extending about a circumference of the washer portion and capturing the washer structure in an assembly with the externally threaded fastener; wherein the end is adapted to abut an internally threaded fastener mateable with the externally threaded fastener.

21. The assembly of claim 20, wherein the retaining structure comprises a projecting rim extending about the washer portion and having at least one reduced diameter catch section below the washer portion.

22. The assembly of claim 20, wherein the retaining structure comprises at least one structurally deformed section.

23. The assembly of claim 20, wherein the externally threaded fastener and the washer structure are rotatable with respect to one another in the assembly.

24. The assembly of claim 20, wherein the externally threaded fastener is a bolt having a head and a threaded section extending from the head.

25. A fastener kit comprising:
   a washer structure having a washer portion and a standoff portion extending from the washer portion to an offset end, wherein the standoff portion is a hollow right cylinder extending substantially perpendicular relative to the washer portion;
   a threaded fastener having a retaining structure extending about a circumference of the washer portion and capturing the washer structure in an assembly with the threaded fastener; and
   a separate threaded fastener receivable at the offset end to mate with the threaded fastener.

26. The fastener kit of claim 25, wherein the retaining structure comprises a projecting rim extending about the washer portion and having at least one reduced diameter catch section below the washer portion.

27. The fastener kit of claim 25, wherein the retaining structure comprises at least one structurally deformed section of the threaded fastener that captures the washer portion.

28. The fastener kit of claim 25, wherein the retaining structure comprises at least one staked section of the threaded fastener that captures the washer portion.

29. The fastener kit of claim 25, wherein the threaded fastener and the washer structure are rotatable with respect to one another in the assembly.

30. A threaded fastener assembly, comprising:
   a washer;
   a hollow right cylinder coupled to the washer, wherein the hollow right cylinder extends completely to an end opposite from the washer; and
   a threaded fastener comprising a plurality of stake portions at discrete positions about a circumference of the washer to retain the washer, the hollow cylinder, and the threaded fastener in the assembly.

31. The threaded fastener assembly of claim 30, wherein the washer is disposed in a recess in the threaded fastener, and the plurality of stake portions extend radially inward at the discrete positions to retain the washer within the recess.

32. The threaded fastener assembly of claim 31, comprising a first one-piece structure having the washer and the hollow cylinder, and a second one-piece structure having the threaded fastener with the plurality of stake portions.

33. A threaded fastener assembly, comprising:
   a stemmed washer, comprising:
      a washer portion; and
      a standoff portion coupled to the washer portion and having a length from the washer portion to a peripheral end opposite the washer portion, wherein at least a substantial portion of the length of the standoff portion is a hollow right cylinder that extends completely to the peripheral end and substantially perpendicular relative to the washer end; and
   a threaded fastener comprising a retainer portion disposed at least partially about a circumference of the washer portion to retain the stemmed washer in the assembly.

34. The threaded fastener assembly of claim 33, wherein the retainer portion comprises a plurality of structures oriented radially inward at discrete positions about a circumference of the washer portion.

* * * * *